(12) United States Patent
Erban et al.

(10) Patent No.: US 10,919,614 B2
(45) Date of Patent: Feb. 16, 2021

(54) AIRFOIL WITH A MAIN WING AND A HIGH-LIFT BODY

(71) Applicant: Airbus Operations GmbH, Hamburg (DE)

(72) Inventors: Marcus Erban, Hamburg (DE); Martin Fees, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 289 days.

(21) Appl. No.: 16/043,934

(22) Filed: Jul. 24, 2018

(65) Prior Publication Data

US 2019/0071166 A1 Mar. 7, 2019

(30) Foreign Application Priority Data

Sep. 6, 2017 (DE) ..................... 10 2017 120 504.7

(51) Int. Cl.
| | | |
|---|---|---|
| *B64C 3/50* | (2006.01) | |
| *B64C 3/28* | (2006.01) | |
| *B64C 9/02* | (2006.01) | |
| *B64C 5/08* | (2006.01) | |
| *B64C 9/24* | (2006.01) | |

(52) U.S. Cl.
CPC .................. *B64C 3/50* (2013.01); *B64C 3/28* (2013.01); *B64C 5/08* (2013.01); *B64C 9/02* (2013.01); *B64C 9/24* (2013.01)

(58) Field of Classification Search
CPC .... B64C 3/50; B64C 3/28; B64C 5/08; B64C 9/02; B64C 9/24
See application file for complete search history.

(56) References Cited

U.S. PATENT DOCUMENTS

| | | | |
|---|---|---|---|
| 1,420,496 A | * | 6/1922 | Ohm ...................... A45B 27/00 416/73 |
| 4,017,041 A | | 4/1977 | Nelson |
| 4,247,063 A | | 1/1981 | Jenkins |
| | | (Continued) | |

FOREIGN PATENT DOCUMENTS

| | | |
|---|---|---|
| DE | 674434 | 4/1939 |
| DE | 102005027749 | 12/2006 |
| | (Continued) | |

OTHER PUBLICATIONS

European Search Report for corresponding European Patent Application No. 18192709.6 dated Jan. 23, 2019.
German Search Report, dated May 3, 2018, priority document.

*Primary Examiner* — Justin M Benedik
(74) *Attorney, Agent, or Firm* — Greer, Burns & Crain, Ltd.

(57) ABSTRACT

An airfoil comprising a main wing and a high-lift body. The high-lift body defines a concave recess. The airfoil further comprises a sealing device having two sealing elements arranged in the concave recess. The sealing elements are plate-shaped and abut sectionally on the high-lift body and have side faces extending perpendicularly to the common rotational axis. When the high-lift body is moved between a retracted position and a deployed position, the sealing elements rotate relative to the main wing and relative to each other, such that an overlap between the sealing elements is smaller when the high-lift body is in the deployed position than when the high-lift body is in the retracted position.

14 Claims, 6 Drawing Sheets

(56) References Cited

U.S. PATENT DOCUMENTS

| | | | | |
|---|---|---|---|---|
| 5,845,877 | A * | 12/1998 | Justice | B64C 7/00 |
| | | | | 244/131 |
| 6,457,680 | B1 | 10/2002 | Dobrzynski et al. | |
| 6,682,023 | B2 * | 1/2004 | Broadbent | B64C 9/26 |
| | | | | 244/214 |
| 7,766,281 | B2 * | 8/2010 | Lorkowski | B64C 3/50 |
| | | | | 244/198 |
| 7,874,524 | B2 | 1/2011 | Lee et al. | |
| 8,534,611 | B1 * | 9/2013 | Pitt | B64C 3/50 |
| | | | | 244/214 |
| 9,254,927 | B2 | 2/2016 | Hodkisson et al. | |
| 2008/0265102 | A1 | 10/2008 | Larssen et al. | |
| 2009/0272853 | A1 | 11/2009 | Raudszus et al. | |
| 2010/0133387 | A1 * | 6/2010 | Wood | B64C 3/48 |
| | | | | 244/219 |
| 2012/0061523 | A1 * | 3/2012 | Havar | B64C 9/24 |
| | | | | 244/214 |
| 2013/0214096 | A1 | 8/2013 | Wailson et al. | |
| 2014/0138487 | A1 * | 5/2014 | Hodkisson | B64C 9/24 |
| | | | | 244/129.2 |
| 2014/0246540 | A1 | 9/2014 | Schlipf et al. | |

FOREIGN PATENT DOCUMENTS

| | | |
|---|---|---|
| DE | 102011105912 | 1/2013 |
| EP | 2296964 | 3/2011 |
| EP | 2733062 A2 | 5/2014 |
| WO | 2009067319 A2 | 5/2009 |
| WO | 2012063046 | 5/2012 |

* cited by examiner

AIRFOIL WITH A MAIN WING AND A HIGH-LIFT BODY

CROSS-REFERENCES TO RELATED APPLICATIONS

This application claims the benefit of the German patent application No. 10 2017 120 504.7 filed on Sep. 6, 2017, the entire disclosures of which are incorporated herein by way of reference.

BACKGROUND OF THE INVENTION

The present invention relates to an airfoil for an aircraft. The airfoil comprises a main wing having a leading edge and a high-lift body having a leading edge and a concavo-convex cross-section transverse to its leading edge such that a concave recess is defined by the high-lift body, which concave recess extends parallel to the leading edge of the high-lift body. The high-lift body is coupled to the main wing at a recessed portion provided in the leading edge of the main wing such that the concave recess faces the main wing. The high-lift body is selectively movable between a retracted position and a deployed position, wherein in the retracted position the leading edge of the main wing and the leading edge of the high-lift body form a continuous common leading edge. The invention also relates to an aircraft comprising such an airfoil.

DE 10 2011 105 912 A1 discloses an airfoil with a main wing, a high-lift body movably arranged at the leading edge of the main wing and an coupling device by which the high-lift body is movably coupled to the main wing. The coupling device comprises several levers and the high-lift body can be reversibly transferred between a retracted position and a deployed position, for example, when a reduced flow velocity shall be compensated at least partially.

It is known that an airflow over an airfoil not only leads to a lift force (lift) but also causes a drag force (drag). The so called "lift-to-drag ratio" (L/D) of an airfoil is of particular importance. When the high-lift body is positioned in the deployed position, a gap opens up between the high-lift body and the main wing. It has been observed that air may flow through this gap in a direction which essentially corresponds to the wing span direction of the main wing or parallel to the leading edge but between the high-lift body and the main wing. This parallel flow increases the airfoil's drag but does not contribute to the lift of the airfoil, i.e., the lift-to-drag ratio is decreased due to the unintended flow parallel to the leading edge of the main wing.

SUMMARY OF THE INVENTION

In view of the above problem it is an object of the present invention to improve the lift-to-drag ratio of an airfoil having a high-lift body.

In a first aspect the problem is solved by an airfoil for an aircraft. The airfoil comprises a main wing and a high-lift body, both having a leading edge. The high-lift body has a concavo-convex cross-section transverse to its leading edge such that a concave recess is defined by the high-lift body. The concave recess extends parallel to the leading edge of the high-lift body. The high-lift body is coupled to the main wing at a recessed portion provided in the leading edge of the main wing such that the concave recess faces the main wing. The high-lift body is selectively movable between a retracted position and a deployed position, wherein in the retracted position the leading edge of the main wing and the leading edge of the high-lift body form a continuous common leading edge. The airfoil further comprises a sealing device having a first sealing element arranged in the concave recess defined by the high-lift body. The first sealing element is plate-shaped, is rotatable about a common rotational axis relative to the main wing, abuts sectionally on the high-lift body and has a side face extending perpendicularly to the common rotational axis. The sealing device is coupled to the high-lift body such that when the high-lift body is moved between the retraced position and the deployed position, the first sealing element rotates relative to the main wing, wherein in the deployed position of the high-lift body at least part of a gap formed between the main wing and the high-lift body in a plane extending perpendicular to the common rotational axis is covered by the sealing device.

A deployed position of the high-lift body is a position in which the high-lift body is displaced from its retracted position. While being displaced or deployed from its retracted or initial position, the high-lift body can be transferred sequentially through several different deployed or high-lift positions until a position of maximum displacement is reached. In each of these deployed positions, the lift of the high-lift body is increased with respect to the retracted state which increases the overall lift of the airfoil.

A sealing device shall be understood as a device which acts against a flow of air through a gap which opens up between the high-lift body and the main wing along the span direction of the main wing when the high-lift body is in the deployed space. In other words, the sealing device is provided for preventing or at least reducing the flow of air parallel to the leading edges of the main wing and the high-lift body through the recess formed by the high-lift body when the latter is in the deployed position.

To this end, the sealing device comprises at least a first plate-shaped sealing element. The sealing element is arranged in the recess formed by the high-lift body. It is mounted to the main wing body such that it can be rotated about a common rotational axis relative to the main wing body.

The sealing element is attached to the main wing such that the plane in which it extends, i.e., the plane in which it is plate-shaped, extends perpendicular to the common rotational axis and at least approximately perpendicular to the direction of extension of the leading edge of the high-lift body in the position where the sealing element is in contact with the high-lift body. In other words, the plate-shaped sealing element extends roughly perpendicular to the flow which flows through the gap between the main wing and high-lift body in the span direction or parallel to the leading edges of the main wing or the high-lift body.

In order to reduce or preferably prevent the parallel flow through the gap, the sealing device is functionally coupled to the high-lift body such that when the high-lift body is moved to a deployed position, the sealing element moves with the high-lift body and blocks the flow path parallel to the leading edges of the main wing and the high-lift body or high-lift device. In this way, the sealing element may block the full gap between the high-lift body and the main wing. However, it may be sufficient if the gap is only partially blocked.

The preferred embodiments of the airfoil as set out in the following description may be combined with each other in any manner unless the contrary is expressly mentioned.

In a preferred embodiment, the airfoil comprises a guiding means mechanically coupling the high-lift body to the main wing, wherein the first sealing element is mechanically coupled to the guiding means. The guiding means is preferably rotatably coupled to the main wing, wherein the guiding means is adapted to rotate relative to the main wing about the common rotational axis. In other words, a mechanical link, i.e., the guiding means, between the high-lift body and the main wing is coupled to the first sealing element such that the first sealing element follows the movement of the guiding means and, therefore, the high-lift body.

It is further preferred to provide a connecting element which connects the first sealing element to the guiding means for driving the first sealing element. The connecting element preferably projects from the first sealing element in a direction extending parallel to the common rotational axis.

In a preferred embodiment, the sealing device comprises a second sealing element arranged in the concave recess defined by the high-lift body. The second sealing element is plate-shaped, is rotatable about the common rotational axis relative to the main wing and has a side face extending perpendicular to the common rotational axis. The first and the second sealing elements are rotatable about a common rotational axis relative to each other. The side faces of the sealing elements extend parallel to each other. When the high-lift body is moved between the retraced position and the deployed position, the second sealing element rotates relative to the main wing and the first and the second sealing elements rotate relative to each other, such that when the first and the second sealing elements are projected on a plane extending perpendicular to the common rotational axis, an overlap between the first and the second sealing elements is smaller when the high-lift body is in the deployed position than when the high-lift body is in the retracted position.

In other words, in the preferred embodiment, the sealing device comprises at least an additional second sealing element. The second sealing element is mounted to the main wing and is rotatable about the same common rotational axis as the first sealing element. However, it is not only rotatable relative to the main wing but also relative to the first sealing element. Hence, the first and the second sealing elements can be arranged under different angles with respect to one another. Preferably, the sealing elements are permanently in contact with each other such that there is no gap between the sealing elements through which air can flow. The contact can, for example, be established by a seal which is fixedly attached to either of the first or the second sealing elements and in sliding contact with the other of the first and the second sealing elements. Alternatively, two seals can be provided, wherein each seal is fixedly mounted to one of the sealing elements and in sliding contact with the other sealing element.

In order to reduce or preferably prevent the parallel flow through the gap, the sealing device is functionally coupled to the high-lift body such that when the high-lift body is moved to a deployed position, the sealing elements fan out and at least partially block the flow path parallel to the leading edges of the main wing and the high-lift body or high-lift device. Fanning out of the sealing elements is realized by rotation of both of the first and the second sealing elements about the common rotational axis. However, since one of the sealing elements rotates about a wider angle than the other, a relative rotation of the sealing elements is created and the elements fan out. Thereby, an overlap of the first and second sealing elements and, in particular, an overlap of these sealing elements is reduced. Using a sealing device with at least two sealing elements which fan out when then high-lift body is moved from the retracted to the deployed position advantageously allows a reduction in the space required for storing the sealing device when the high-lift body is in the retracted position.

It should be noted that the sealing element can, as already indicated above, comprise more than two sealing elements. All of these sealing elements are attached rotatably to the main wing such that they can rotate about the common axis of rotation or common rotational axis relative to the main wing device and relative to each other. Also this plurality of sealing elements can fan out such that an overlap between the sealing elements is reduced when the high-lift body is moved to the deployed position. Note that when more than two sealing elements are used, an overlap between two sealing elements which are not directly adjacent to each other can be reduced to zero without creating a gap between these sealing elements since an additional sealing element can cover the gap.

In a preferred embodiment, the first and the second sealing elements are connected via a first guide rail and a first connector guided in the first guide rail. The first guide rail preferably comprises an upper and a lower end stop or engagement with a corresponding first end stop bolt for limiting the motion of the first and the second sealing element with respect to one another. Preferably, the second sealing element is driven via the first end stop bolt when the first end stop bolt engages with either the upper or the lower end stop of the first guide rail. Hence, the first and the second sealing element can move relative to another but are connected via the first guide rail, the first connector being guided therein. By providing an end stop, movement of either the first or the second sealing element can advantageously be transferred to the other of the first or the second sealing element for transferring the motion of one sealing element to the other. Thus, no additional drive means is necessary.

In an exemplary preferred embodiment, the first guide rail is fixedly attached to the second sealing element and the first connector is attached the first sealing element.

It is preferred if the first guide rail comprises a second end stop limiting the motion of the first and the second sealing elements with respect to one another, wherein the second sealing element is preferably driven via the first connector when the first connector engages with the second end stop of the first guide rail. By providing two end stops, the one of the sealing elements can be driven in both directions of rotation about the common rotational axis by the other sealing element.

It is further preferred to arrange a first seal on the first sealing element, wherein the first seal is in contact with the high-lift body, and/or to arrange a second seal on the second sealing element, wherein the second seal is in contact with the high-lift body. Thereby, advantageously a sealing engagement between the sealing elements and the high-lift body can be established for further reducing the unintended and undesirable parallel flow. The seals are preferably attached to the sealing elements. The sealing elements slide along the surface of the high-lift body delimiting the latter towards the concave recess defined by the high-lift body, when the high-lift body moves between the retracted and the deployed position. Placing the seals on the sealing elements reduces the effort of correctly placing them since the exact trajectory does not need to be known. Further, shorter seals can be used since only the outer surface of the sealing element needs to be covered with a seal and not the entire trajectory of the sealing element on the inner surface of the high-lift body.

In another preferred embodiment, the second sealing element is connected via a second guide rail and a second connector guided in the second guide rail to the main wing, wherein the second guide rail comprises an upper and a lower end stop for engagement with a corresponding second end stop bolt for limiting the motion of the second sealing element relative to the main wing. Using a guide rail and connector guide in the guide rail connection, e.g., a guided block rail connection, between the second sealing element and the main wing has the same advantages as connecting the first and the second sealing element using such a connection. Preferably, the second guide rail is fixedly attached to the main wing and the second connector is attached to the second sealing element.

In a preferred embodiment, the main wing comprises a support face extending perpendicular to the common rotational axis and parallel to the second sealing element. The second sealing element is connected via the second guide rail and the second connector in the second guide rail to the support face. When the second sealing element and the support face are projected on a plane extending perpendicular to the common rotational axis, an overlap between the second sealing element and the support face is smaller when the high-lift body is in the deployed position than when the high-lift body is in the retracted position. The support face advantageously extends the sealing device towards the main wing thereby increasing the area of the gap between the main wing and the deployed high-lift body that is blocked for further flow. The support face could be understood as extending the fan formed by the sealing elements of the sealing device. If the sealing device comprises only a first sealing element, the first sealing element could be connected to the support surface via the second guide rail and the second connector. In this case, the considerations presented above with regard to the second sealing element being connected to the support face also apply to the first sealing element.

Preferably, in the deployed position and in the retracted position of the high-lift body, the second sealing element is in contact with the support face of the main wing, wherein the contact is preferably provided by a third seal. Hence, the flow that can pass through a potential gap between the second sealing element and the support face is minimized.

In another preferred embodiment, the airfoil comprises a guiding mechanism for controlling the relative motion of the first sealing element and the second sealing element, the guiding mechanism comprising a guiding lever with two pivot points spaced apart from each other and spaced apart from a mounting point where the guiding lever is mounted rotatably to the main wing, wherein a first guiding rod mechanically connects the first pivot point to the first sealing element and wherein a second guiding rod mechanically connects the second pivot point to the second sealing element. The guiding mechanism advantageously ensures that the first and the second sealing element are rotated by different angles about the common rotational axis and, therefore, fan out.

It is preferred that the guiding lever is mounted rotatably on the supporting face.

According to a further preferred embodiment, the high-lift body is a droop nose. This embodiment has the advantage of increasing the lift that is generated when the high-lift body is in the deployed position.

In another aspect, the present invention provides an aircraft comprising an airfoil according to any of the preceding embodiments, by which lift-to-drag ratio of the airfoil can be improved. Preferably, the high-lift body is arranged between the fuselage of the aircraft and an engine supported by the airfoil.

BRIEF DESCRIPTION OF THE DRAWINGS

Further advantages of the airfoil and the aircraft according to the invention and of its preferred embodiments become apparent from the attached figures. These show partially schematically.

DETAILED DESCRIPTION OF THE PREFERRED EMBODIMENTS

Figure 1:
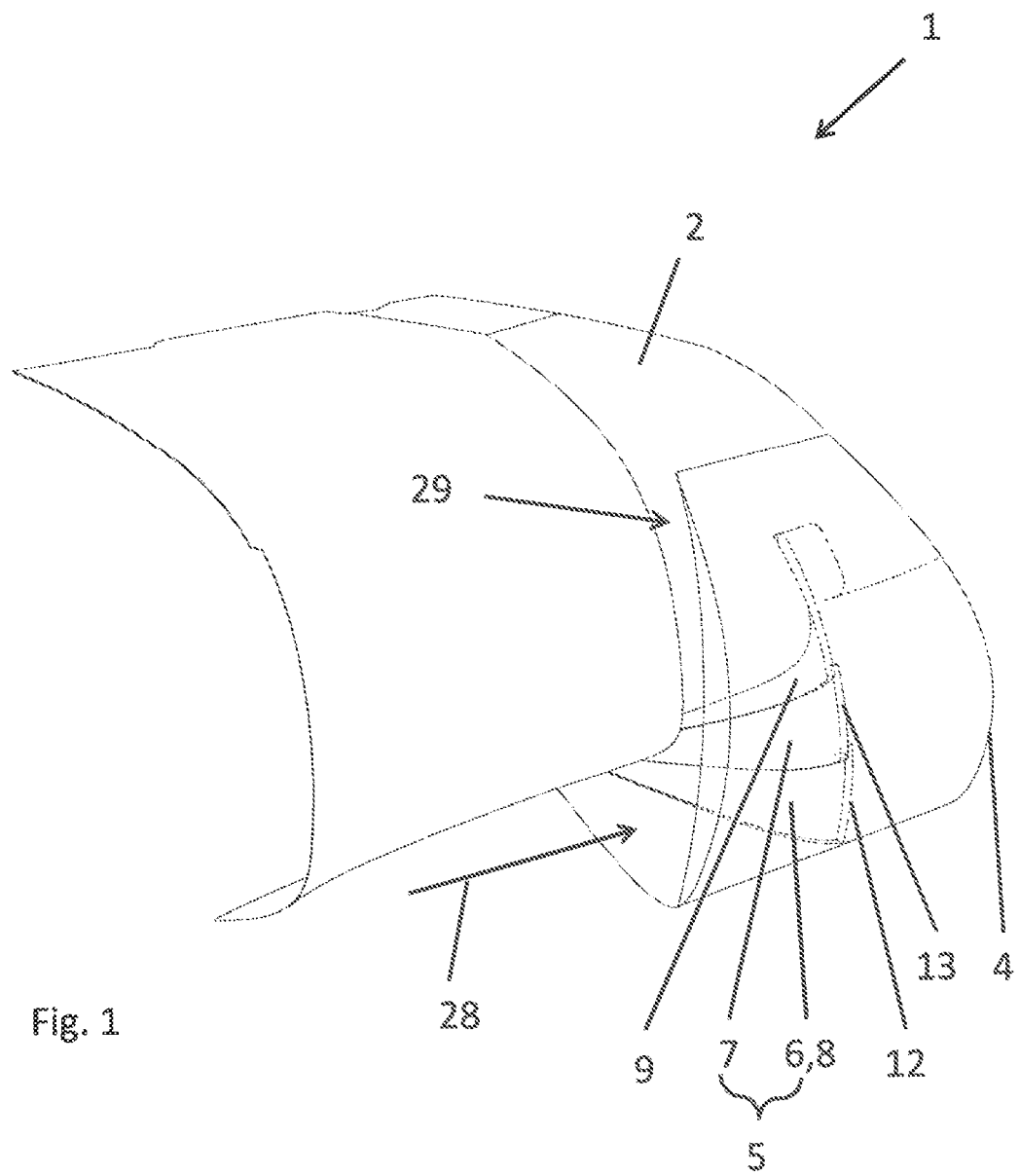
FIG. 1 is a perspective view on a preferred example of an airfoil with a high-lift body positioned in a deployed position.

FIGS. 1 to 9 show different schematic perspective views of a preferred example of an airfoil 1. While FIG. 1 shows a schematic drawing of the airfoil 1 in a deployed state in which many details are not shown, FIGS. 2 to 9 show the same airfoil 1 in more detail. As set out in the following paragraphs in more detail, not all Figures show all elements of the airfoil 1. In some Figures some elements of the airfoil 1 are not shown to provide an unobstructed view of other elements of the airfoil 1.

Figure 2:
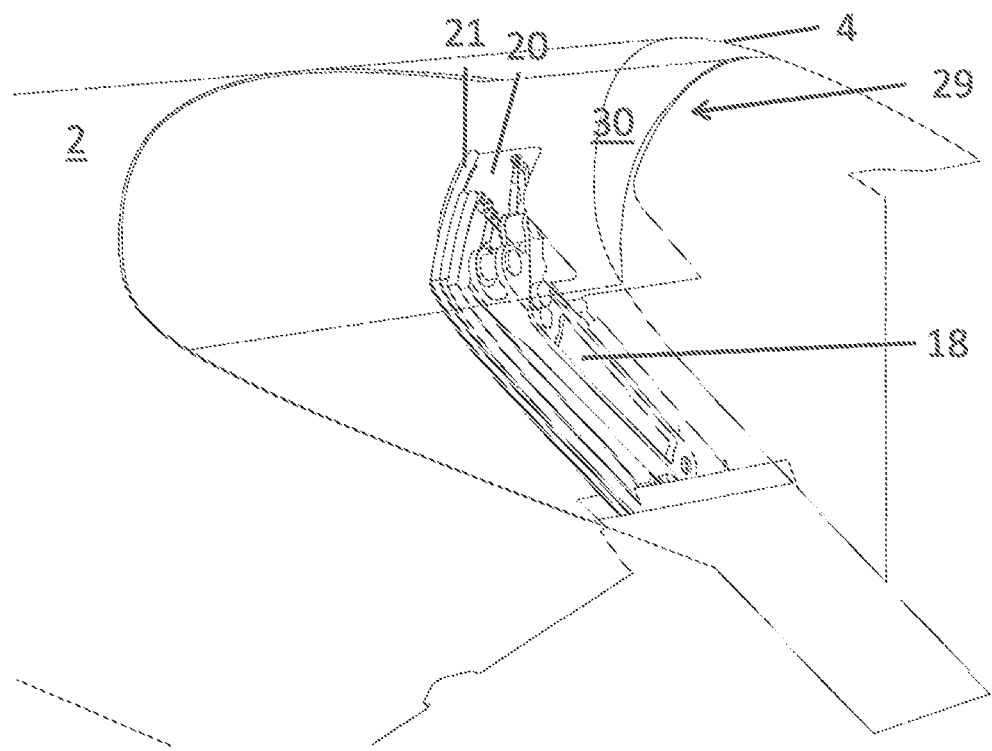
FIG. 2 is another perspective view of the example shown in FIG. 1 but with the high-lift body positioned in a retracted position.
Figure 3:
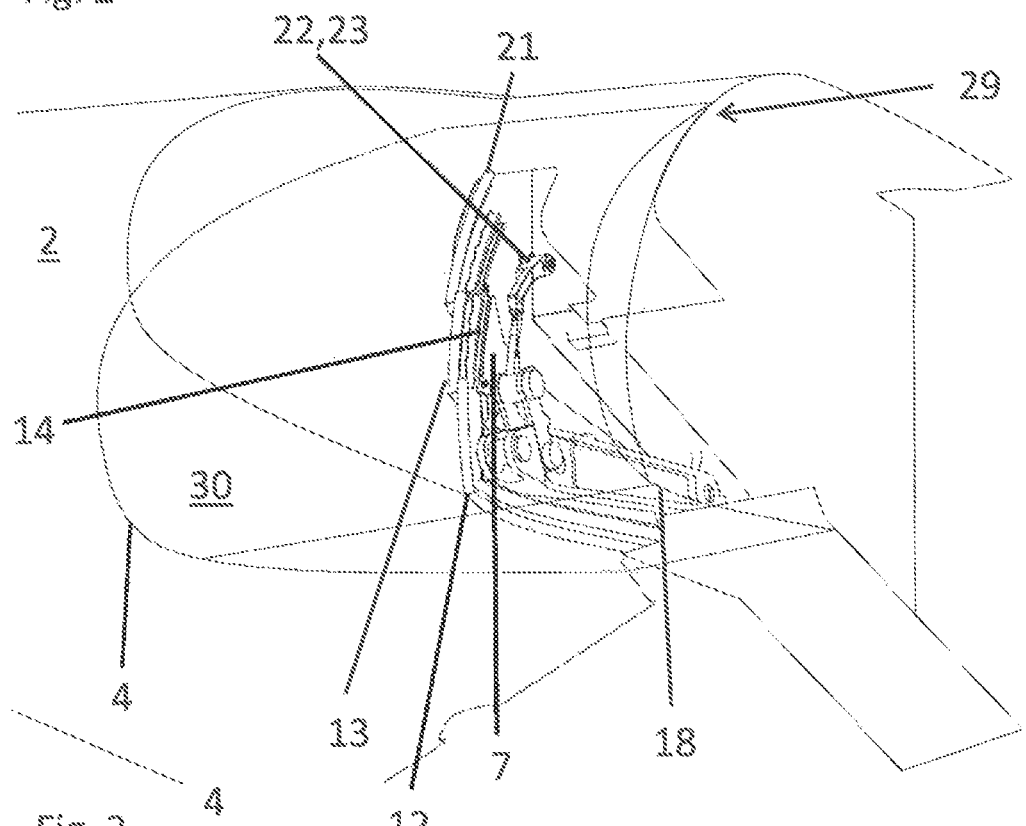
FIG. 3 is another perspective view of the example shown in FIGS. 1 and 2 with the high-lift body positioned in a deployed position.
Figure 4:
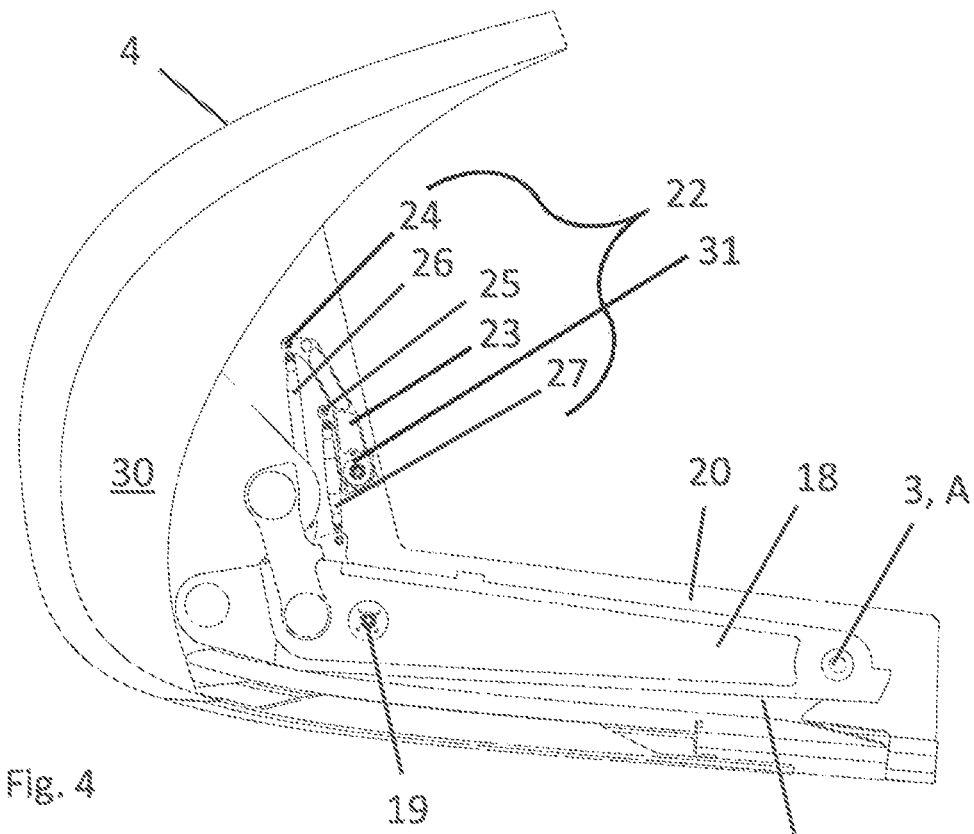
FIG. 4 is a side view of a detail of the example shown in FIGS. 1 to 3 with the high-lift body positioned in the retracted position.
Figure 5:
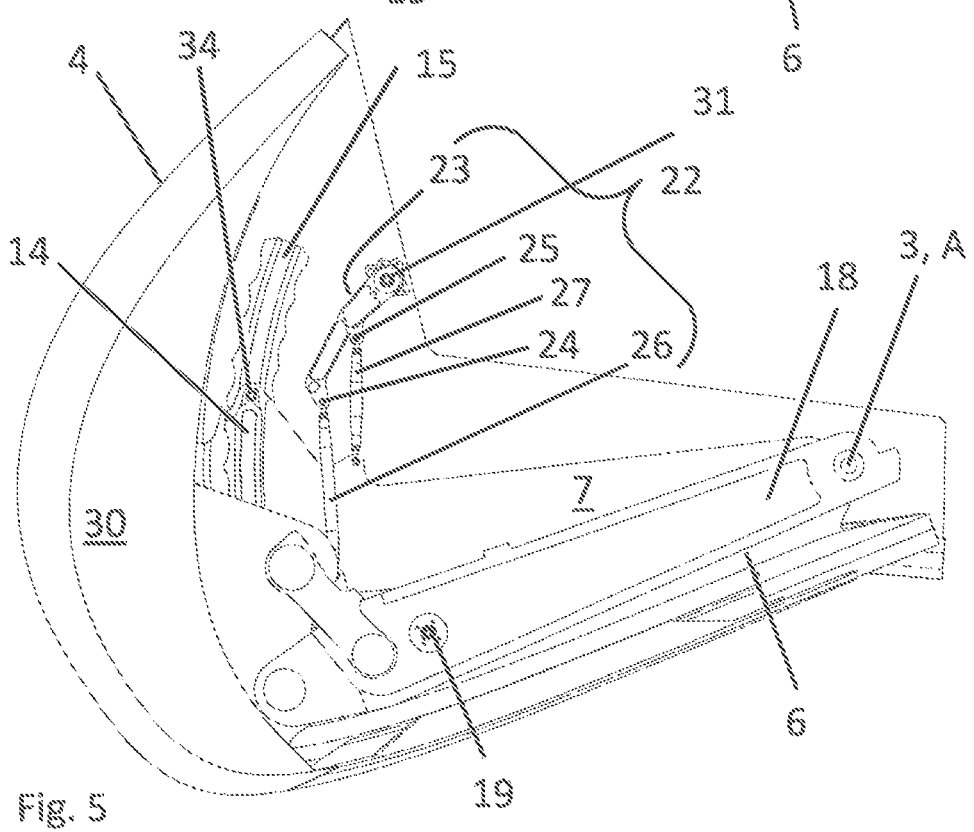
FIG. 5 is a side view of a detail of the example shown in FIGS. 1 to 4 with the high-lift body positioned in the deployed position.
Figure 6:
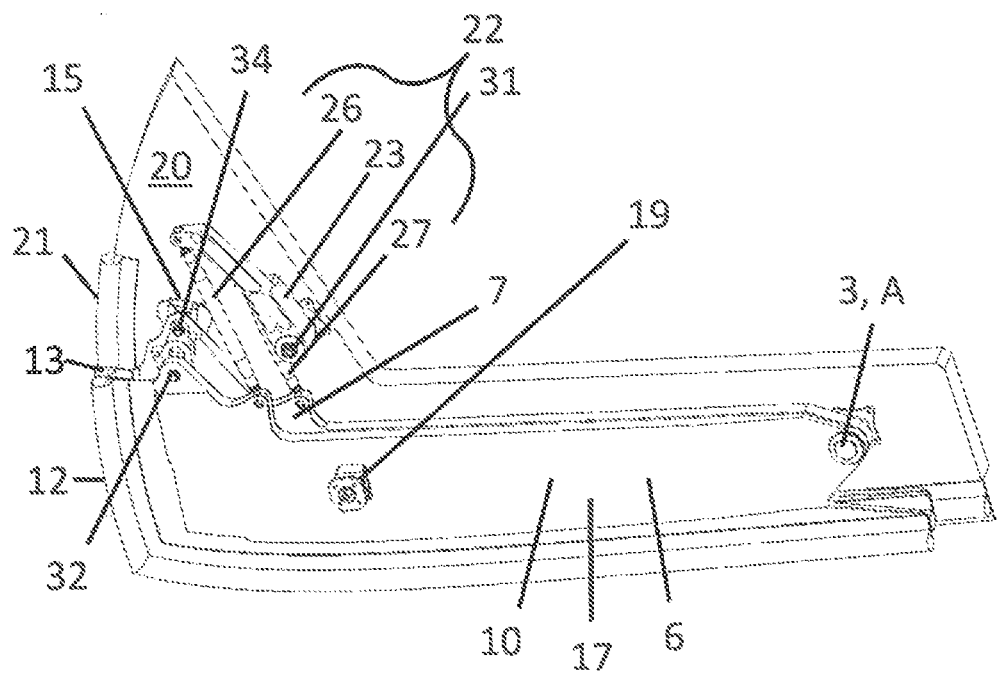
FIG. 6 is a perspective view particularly of the sealing device of the example shown in FIGS. 1 to 5 with the high-lift body positioned in the retracted position.
Figure 7:
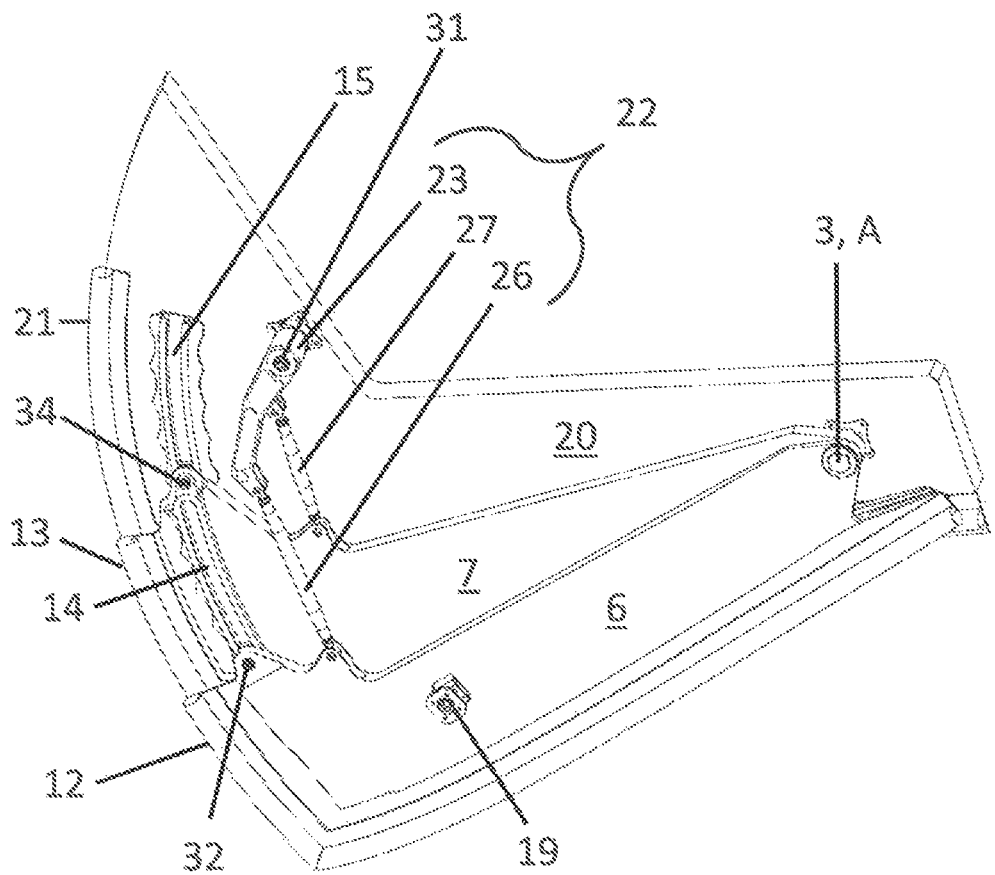
FIG. 7 is a perspective view particularly of the sealing device of the example shown in FIGS. 1 to 6 with the high-lift body positioned in the deployed position.

The airfoil 1 generally comprises a main wing 2 and a high-lift body 4, which is depicted in a translucent manner in FIGS. 1 to 3, such that parts of the airfoil 1 behind the high-lift body 4 are visible. The high-lift body 4 is shown in a retracted position in FIGS. 2, 4, 6 and 8 and in a deployed position in FIGS. 1, 3, 5, 7 and 9. FIGS. 4 to 9 show only limited elements of the main wing 2 and in FIGS. 6 to 9 the high-lift body 4 is not shown for an improved ease of understanding.

The high-lift body 4 is a droop nose well-known in the prior art. It has a concavo-convex cross-section transverse to its leading edge whereby a concave recess 30 is defined. The concave recess 30 faces towards the main wing 2. The high-lift body 4 is preferably slidingly supported on a recessed portion 29 of the main wing 2.

The main wing 2 and the high-lift body 4 are coupled to each other by means of a supporting or interconnection element 3 (see FIGS. 4 to 9) in such a manner that the high-lift body 4 is selectively movable with respect to the main wing 2 between a retracted position illustrated in FIGS. 2, 4, 6, 8 and a deployed position illustrated in FIGS. 1, 3, 5, 7, 9. The high-lift body 4 is arranged at a leading edge of the main wing 2, and as can be best seen in FIG. 2 within the recess 29 provided in the main wing 2, such that it forms a continuous leading edge together with the main wing 2 in the retracted position. In the deployed position as shown in FIGS. 1 and 3, the high-lift body 4 is displaced with respect to the main wing 2 such that it extends from the main wing 2. Thereby a gap is created between the high-lift body 4 and the main wing 2 into which air can enter in a direction parallel to the leading edge of the main wing 2 and the leading edge of the high-lift body (see the continuous arrow 28 in FIG. 1). If a flow is generated by air flowing through the gap in this direction, the drag of the wing increases without an additional increase in lift. Hence, the lift-to-drag ratio decreases.

To overcome this detrimental effect, the airfoil 1 has a sealing device 5 comprising a first plate-shaped sealing element 6 and a second plate-shaped sealing element 7 which are supported rotatably by the supporting element 3 about a common rotational axis A. Both sealing elements 6, 7 can rotate about the common rotational axis A with respect to the main wing 2 to which the supporting element 3 is fixed attached and also relative to each other. The first sealing element 6 abuts sectionally on the high-lift body 4 and has a first side face 8 which extends perpendicularly to the common rotational axis A. The second sealing element 7 also abuts sectionally on the high-lift body 4 and has a second side face 9 which extends perpendicularly to common rotational axis A. The sealing elements 6, 7, can be stabilized using a web 17 and depression 10 structure. The sealing device 5 is provided to prevent or at least drastically reduce an air flow flowing through the gap in a direction 28 extending parallel to the leading edge of the high-lift body 4 and the main wing 2. To this end, the movement of the sealing elements 6, 7 is coupled to the movement of the high-lift body 4 between the retracted position and the deployed position. The coupling is provided in such a manner that when the high-lift body 4 is moved, both sealing elements 6, 7 rotate about the common rotational axis A with respect to the main wing 2 and also with respect to each other. Due to the relative motion of the sealing elements 6, 7 with respect to each other, the sealing elements fan out and cover a greater area of the gap than if they did not fan out. Hence, advantageously a larger gap can be blocked by the sealing elements 6, 7 but only little space is required for storing the sealing elements 6, 7 when the high-lift body 4 is in the retracted position.

The sealing elements 6, 7 are arranged in the concave recess 30 and connected to the main wing 2 and the high-lift body 4 in such a manner that an overlap between the sealing elements 6, 7 is smaller in the deployed position of the high-lift body 4 than in its retracted position. The overlap between the sealing elements 6, 7 is the area that is covered by both sealing elements 6, 7 when the sealing elements 6, 7 are projected on an imaginary plane extending perpendicular to the common rotational axis A.

The first sealing element 6 is in sealing engagement with the high-lift body 4 via a first seal 12 which is fixedly attached to the first sealing element 6. Likewise, the second sealing element 7 is sealed with respect to the high-lift body 4 using a second seal 13. The second seal 13 is mounted to the second sealing element 7. Both seals 12, 13 are in sliding contact with an inner surface of the high-lift body delimiting the concave recess 30 defined by the high-lift body 4. The first and second sealing elements 6, 7 overlap each other both in the retracted position and the deployed position of the high-lift body 4. Furthermore, a seal (not shown) is provided which seals a potential gap between the sealing elements 6, 7.

The high-lift body 4 is connected to the main wing 2 by means of a guiding means 18 which is shown in FIGS. 2 to 5. In FIGS. 6 to 9 the guiding means 18 is not shown for an unobstructed view on the sealing device 5. The guiding means 18 is commonly provided for guiding the high-lift body 4 between the retracted position and the deployed position. It is rotatably mounted to the main wing 2. The axis of rotation of the guiding means 18 coincides with the common rotational axis A of the sealing elements 6, 7. The details of the guiding means 18 when it comes to guiding the high-lift body 4 are outside of the scope of the present invention.

In the present exemplary embodiment the guiding means 18 is additionally provided for driving the first sealing element 6. To this end the sealing element 6 is connected via a connecting element 19 to the guiding means 18. The connecting element 19 is shown in each of FIGS. 4 to 9. As can be seen best in FIGS. 6 to 9, the connecting element 19 projects perpendicularly out of the first sealing element 6 and parallel to the common rotational axis. Due to the connection of the guiding means 18 and the first sealing means 6, the latter is rotated relative to the main wing 2 when the high-lift body 4 is moved between the retracted and the deployed position in either direction.

The relative motion of the first and second sealing elements 6, 7 is controlled via a guiding mechanism 22 which is only used in the exemplary embodiment shown in FIGS. 4 to 7. The guiding mechanism 22 comprises a rotatable guide lever 23 with two spaced apart pivot points 24, 25. A first guiding rod 26 is attached to the guide lever 23 at the first pivot point 24 and connects the first sealing element 6 to the guide lever 23. A second guiding rod 27 connects the rotatable guide lever 23 to the second sealing element 7. The second guiding rod 27 is attached to the guide lever 23 at the second pivot point 25. The two pivot points 24, 25 are spaced apart from each other and from a mounting point 31 at which the guide lever 23 is rotatably connected to the main wing 2. Due to the different positions of the pivot points 24, 25 along the guide lever 23, the guiding means 22 ensures that the first and second sealing element 6, 7 are rotated by different angles about the common rotational axis A when the high-lift body 4 is moved between the retracted and the deployed position. Due to the differential rotation the sealing elements 6, 7 fan out and cover the entire gap between the high-lift body 4 and the main wing 2.

FIGS. 4 to 9 also show the first and second guide rails 14, 15 provided on the second sealing element 7 and the support face 20, respectively. The first guide rail 14 is provided for coupling the first and the second sealing elements 6, 7 by guiding a first connector 32 which is only visible in FIGS. 6 to 9. The second guide rail 15 is provided for connecting the second sealing element 7 to the main wing 2 and, in particular, the support face 20. A second connector 34 is mounted on the second sealing element 7 which is guided in the second guide rail 15. The guide rails 14, 15 and the corresponding connectors 32, 34 are provided for ensuring the relative position of the sealing elements 6, 7 to one another and to the support face 20 such that gaps between the sealing elements 6, 7 and the other parts of the airfoil 1 are prevented.

Figure 8:
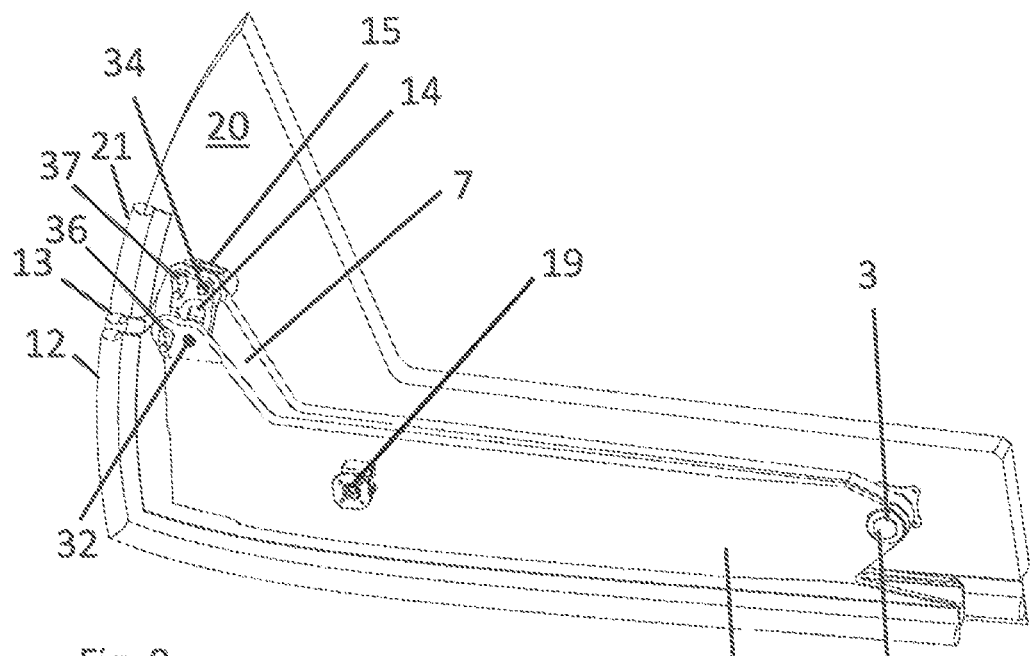
FIG. 8 is a perspective view of a sealing device of another exemplary embodiment with a high-lift body positioned in the retracted position.
Figure 9:
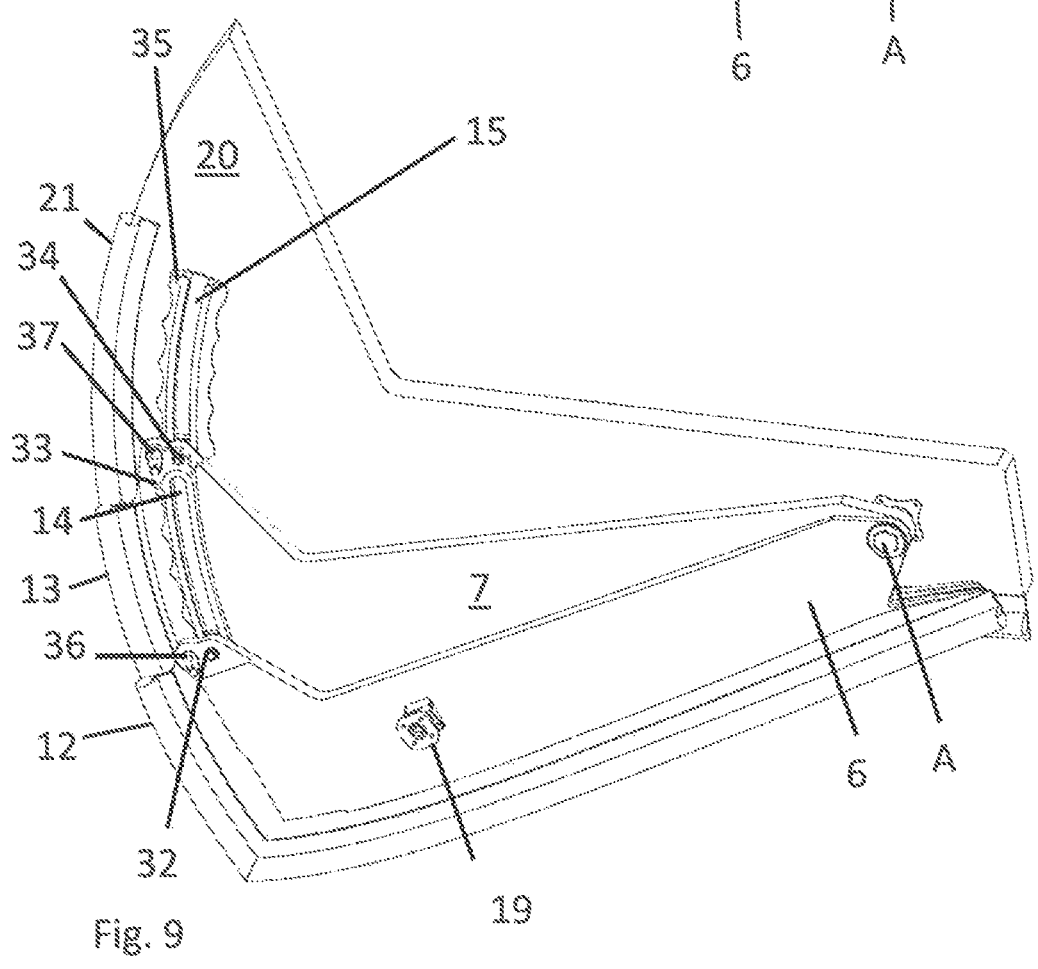
FIG. 9 is a perspective view of the sealing device of FIG. 8 with the high-lift body positioned a deployed position.

In the exemplary embodiment shown in FIGS. 8 and 9, no guiding mechanism 22 is provided. In this embodiment, lower and upper end stops 33, 35 of the guide rails 14, 15 and corresponding first and second end stop bolts 36, 37 are provided for transferring the movement from the first sealing element 6 to the second sealing element 7 and for limiting the movement of the sealing elements 6, 7. Each guide rail 14, 15 comprises upper and lower end stops 33, 35 out of which only the upper end stops 33, 35 are visible in FIGS. 8 and 9. The lower end stops are hidden behind the first and the second sealing elements 6, 7, respectively. The first end stop bolt 36 is provided on the first sealing element 6 for engagement with the upper and lower end stops 33 of the second sealing element 7. Likewise, the second end stop bolt 37 is provided on the second end sealing element 7 for engagement with the upper and lower end stops 35 of the support face 20.

The lower and upper end stops 33, 35 and the corresponding first and second end stop bolts 36, 37 are provided for limiting the movement of the first and second sealing elements 6, 7 with respect to one another and also with respect to the main wing 2. Further, the upper and lower end stops 33 on the second sealing element 7 and the corresponding first end stop bolts 36 also serve for transferring the movement from the first sealing element 6 to the second sealing element 7. For example, when the first sealing element 6 is moved along with the high-lift body 4 from the deployed to the retracted position, the first connector 32 slides along the first guide rail 14 until the first end stop bolt 36 engages the upper end stop 33 of the first guide rail 14. Only then the movement of the first sealing element 6 is transferred through the upper end stop 33 and the first end stop bolt 36 to the second sealing element 7. In the opposite direction, when the first sealing element 6 is moved along with the high-lift body 4 towards the deployed position, the movement is only transferred to the second sealing element 7 after the first end stop bolt 36 has engaged the lower end stop on the second sealing element 7.

In addition to the guide rails 14, 15 and the guiding mechanism 22, seals 12, 13 and 21 are provided for sealing any gaps between the high-lift body and the sealing elements 6, 7 and the support face 20. The seals 12, 13 are mounted on the sealing elements 6, 7 and the seal 21 on the support face 20, respectively, and in sliding contact with an inner surface of the high-lift body which delimits the concave recess defined by the high-lift body.

Figure 10:
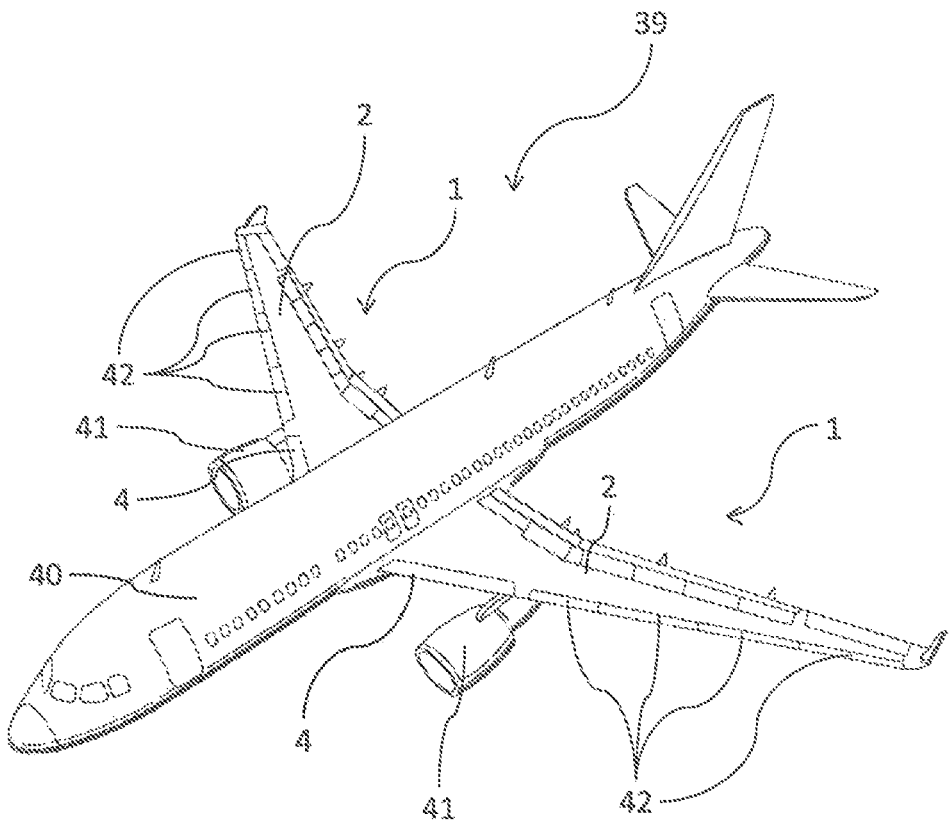
FIG. 10 is a perspective view of an exemplary embodiment of an aircraft according to the present invention.

FIG. 10 shows a perspective view of an exemplary embodiment of an aircraft 39 according to the present invention. The aircraft 39 comprises a fuselage 40 and two airfoils 1. Each of the airfoils 1 comprises a main wing 2 and a jet engine 41. Furthermore, each airfoil 1 comprises as an exemplary embodiment of a high-lift body 4 according to the present invention. The leading edge high-lift body 4 is mounted on the respective airfoil 1 between the fuselage 40 of the aircraft 39 and the respective jet engine 41. Locating the high-lift body 4 in the position is particularly advantageous as here the most significant lateral flows have been observed. However, it is also conceivable that the remaining leading-edge devices 42 are exemplary embodiments of high-lift bodies described above.

Figure 11:
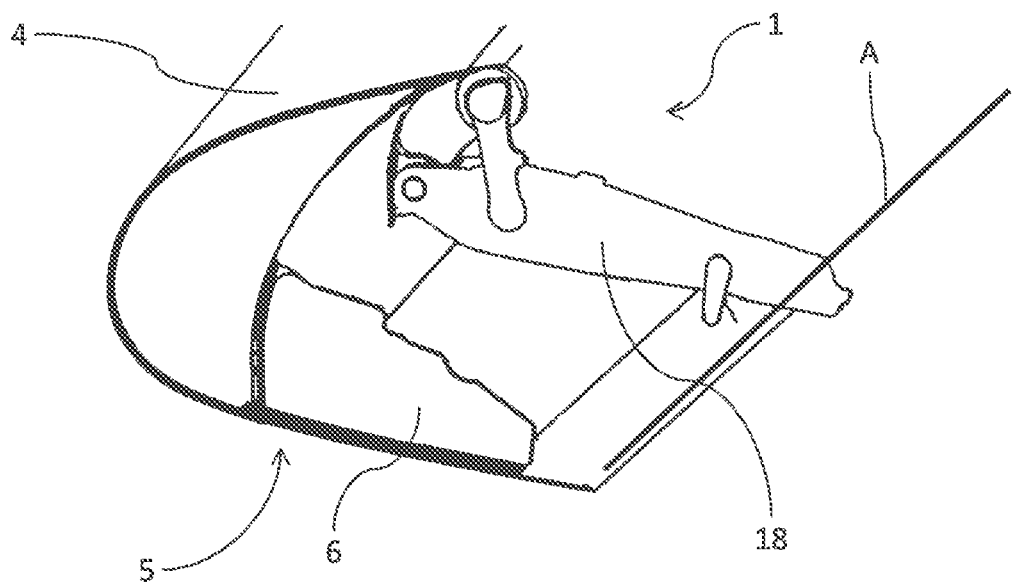
FIG. 11 is a perspective view of a second exemplary embodiment of a part of an airfoil according to the present invention.

Finally, FIG. 11 shows an exemplary embodiment of an airfoil 1 according to the present invention. Of the airfoil 1, only a high-lift body 4 and a sealing device 5 are partially shown. As can be taken readily from FIG. 11, sealing device 5 comprises only a single first sealing element 6 which is connected to the high-lift body 4. When the high-lift body 4 is moved between a retraced and a deployed position using a guiding means 18, the first sealing element 6 moves with the high-lift body 4 and rotates relative to the main wing (not shown) about a common rotational axis A. Thus, a gap formed between the main wing and the high-lift body 4 in the deployed position of the high-lift body 4 in a plane extending perpendicular to the common rotational axis A is advantageously at least partially covered by the first sealing element 6 of the sealing device 5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airfoil for an aircraft, the airfoil comprising:
 a main wing having a leading edge,
 a high-lift body having a leading edge and a concavo-convex cross-section transverse to its leading edge such that a concave recess is defined by the high-lift body, which concave recess extends parallel to the leading edge of the high-lift body,
 wherein the high-lift body is coupled to the main wing at a recessed portion provided in the leading edge of the main wing such that the concave recess faces the main wing, and
 wherein the high-lift body is selectively movable between a retracted position and a deployed position, wherein in the retracted position the leading edge of the main wing and the leading edge of the high-lift body form a continuous common leading edge, and
 a sealing device having a first sealing element arranged in the concave recess defined by the high-lift body,
 wherein the first sealing element is plate-shaped, is rotatable about a common rotational axis relative to the main wing, abuts sectionally on the high-lift body and has a side face extending perpendicular to the common rotational axis,
 wherein the sealing device is coupled to the high-lift body such that when the high-lift body is moved between the retraced position and the deployed position, the first element rotates relative to the main wing, and
 wherein in the deployed position of the high-lift body at least part of a gap formed between the main wing and the high-lift body in a plane extending perpendicular to the common rotational axis is covered by the sealing device
 wherein the sealing device comprises a second sealing element arranged in the concave recess defined by the high-lift body,
 wherein the second sealing element is plate-shaped, is rotatable about the common rotational axis relative to the main wing and has a side face extending perpendicular to the common rotational axis,
 wherein the first and the second sealing elements are rotatable about a common rotational axis relative to each other and wherein the side faces of the sealing elements extend parallel to each other, and wherein when the high-lift body is moved between the retraced position and the deployed position, the second sealing element rotates relative to the main wing and the first and the second sealing elements rotate relative to each other, while constantly maintaining their side faces parallel to each other, such that when the first and the second sealing elements are projected on a plane extending perpendicular to the common rotational axis, an overlap between the first and the second sealing elements is smaller when the high-lift body is in the deployed position than when the high-lift body is in the retracted position.

2. The airfoil according to claim 1, wherein the airfoil further comprises a guiding means mechanically coupling the high-lift body to the main wing, wherein the first sealing element is mechanically coupled to the guiding means.

3. The airfoil according to claim 2, wherein the guiding means is rotatably coupled to the main wing, wherein the guiding means is adapted to rotate relative to the main wing about the common rotational axis.

4. The airfoil according to claim 2, wherein a connecting element connects the first sealing element to the guiding means for driving the first sealing element,
wherein the connecting element projects from the first sealing element in a direction extending parallel to the common rotational axis.

5. The airfoil according to claim 1, wherein a first seal is arranged on the first sealing element, wherein the first seal is in contact with the high-lift body.

6. The airfoil according to claim 1, wherein the first and the second sealing elements are connected via a first guide rail and a first connector guided in the first guide rail.

7. The airfoil according to claim 1,
wherein the first guide rail comprises an upper and a lower end stop for engagement with a corresponding first end stop bolt limiting a motion of the first and the second sealing elements with respect to one another, and
wherein the second sealing element is preferably driven via the first end stop bolt when the first end stop bolt engages with either of the upper or the lower end stop of the first guide rail.

8. The airfoil according to claim 1, wherein a second seal is arranged on the second sealing element, wherein the second seal is in contact with the high-lift body.

9. The airfoil according to claim 1, wherein the second sealing element is connected via a second guide rail and a second connector guided in the second guide rail to the main wing,
wherein the second guide rail comprises an upper and a lower end stop for engagement with a corresponding second end stop bolt limiting a motion of the second sealing element relative to the main wing.

10. The airfoil according to claim 9,
wherein the main wing comprises a support face extending perpendicular to the common rotational axis and parallel to the second sealing element,
wherein the second sealing element is connected via the second guide rail and the second connector guided in the second guide rail to the support face,
wherein when the second sealing element and the support face are projected on a plane extending perpendicular to the common rotational axis, an overlap between the second sealing element and the support face is smaller when the high-lift body is in the deployed position than when the high-lift body is in the retracted position, and
wherein in the deployed position and in the retracted position of the high-lift body, the high-lift body is preferably in contact with the support face of the main wing, wherein the contact is preferably provided by a third seal.

11. The airfoil according to claim 1, further comprising a guiding mechanism for controlling a relative motion of the first sealing element and the second sealing element, the guiding mechanism comprising a guiding lever with two pivot points spaced apart from each other and spaced apart from a mounting point where the guiding lever is mounted rotatably to the main wing, wherein a first guiding rod mechanically connects a first of the two pivot points to the first sealing element and wherein a second guiding rod mechanically connects a second of the two pivot points to the second sealing element.

12. The airfoil according to claim 11, wherein the guiding lever is mounted rotatably on the supporting face.

13. The airfoil according to claim 1, wherein the high-lift body is a droop nose.

14. An aircraft comprising an airfoil according to claim 1, wherein the high-lift body is arranged between a fuselage of the aircraft and an engine supported by the airfoil.

* * * * *